W. L. MONTAGUE.
EXPANDING CHAIN WHEEL.
APPLICATION FILED MAR. 23, 1910.
980,662.
Patented Jan. 3, 1911.
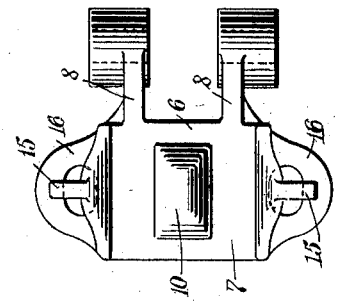
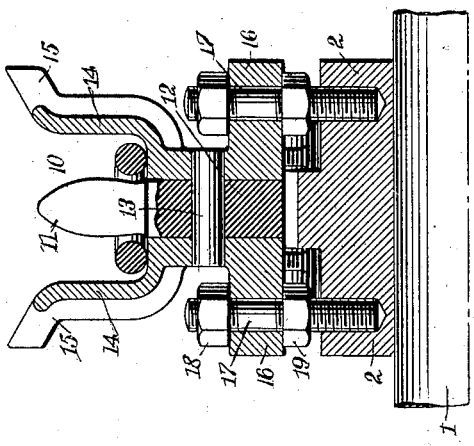
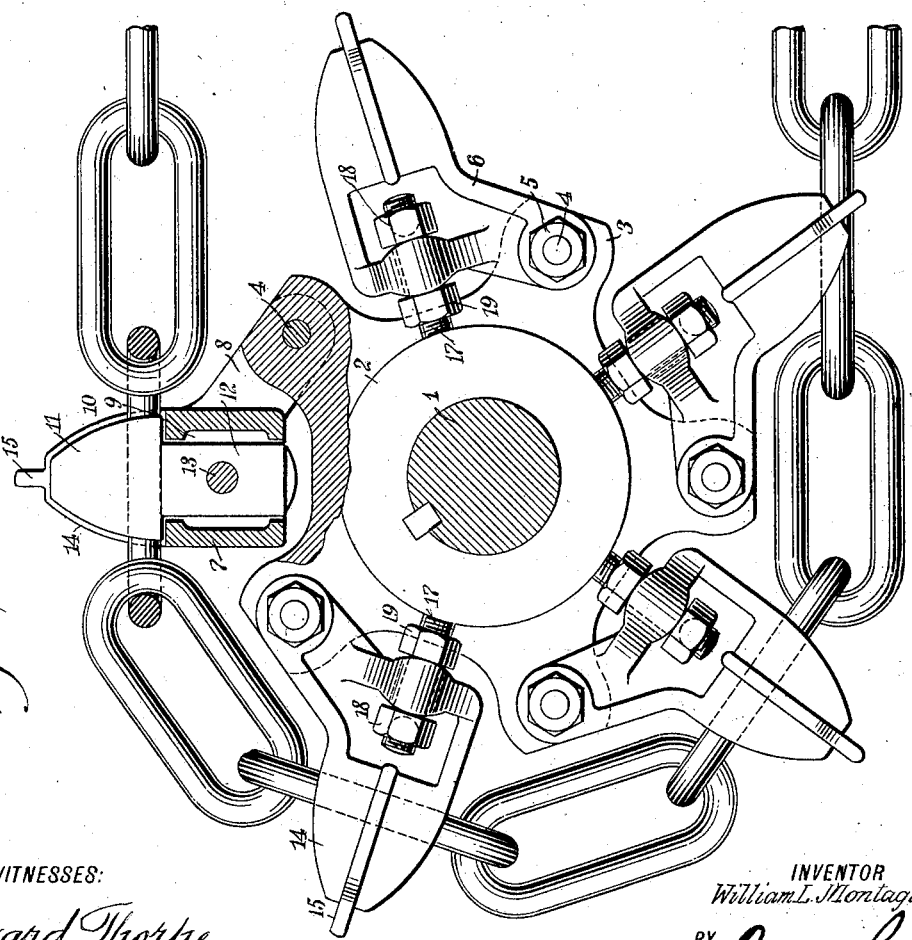
WITNESSES:
Edward Thorpe
H. Whiting
INVENTOR
William L. Montague
BY Munn & Co.
ATTORNEYS

UNITED STATES PATENT OFFICE.

WILLIAM LATANÉ MONTAGUE, OF BELMONT, NEW YORK.

EXPANDING CHAIN-WHEEL.

980,662.  Specification of Letters Patent.  Patented Jan. 3, 1911.

Application filed March 23, 1910. Serial No. 551,028.

*To all whom it may concern:*

Be it known that I, WILLIAM L. MONTAGUE, a citizen of the United States, and a resident of Belmont, in the county of Allegany and State of New York, have invented a new and Improved Expanding Chain-Wheel, of which the following is a full, clear, and exact description.

This invention relates to a new and improved chain wheel of the expanding or compensating type, in which the distance of the teeth from the center may be varied for various purposes.

An object of this invention is to provide a device which will be simple in construction, inexpensive to manufacture, strong, durable, easily adjusted, and readily accessible for purposes of cleaning, renewing or repairing the parts.

A further object of this invention is to provide an expanding wheel having teeth capable of being adjusted to various distances from the hub, with means for locking the teeth in their adjusted positions.

A still further object of this invention is to provide an expanding wheel with teeth adjustable as to their distance from the hub, and having the teeth so supported that they will have a limited play to allow for differences in pitch or spacing of the links of the chain.

These and other objects, together with the construction and combination of parts, will be more particularly pointed out in this specification and set forth in the claims.

Reference is to be had to the accompanying drawings, forming a part of this specification, in which similar characters of reference indicate corresponding parts in all the figures, and in which—

Figure 1 is a side view in elevation, with portions thereof broken away, to show the underlying construction; Fig. 2 is a transverse section through one of the teeth and holders, showing their connection with the hub of the wheel; and Fig. 3 is a top plan view of one of the holders detached from the hub of the wheel.

Referring more particularly to the separate parts of the device, 1 indicates a shaft to which my device is to be secured. Secured to the shaft 1 in any well-known manner, there is provided a hub 2, which has extended therefrom at suitably spaced intervals, a plurality of lugs 3. These lugs 3 are provided with openings through which extend suitable pivot pins 4 in the nature of bolts provided with nuts 5 at the ends thereof. These pivot pins 4 pivotally secure to the lugs 3, tooth holders 6. Each of the tooth holders 6 consists of a body portion 7 and arms 8 extending in angular relation to the body portion 7. The arms 8 are provided with openings through which the pivot pins or bolts 4 are inserted, and the body portion 7 is provided with a socket opening 9 in which is adjustably supported a tooth 10. The tooth 10 may be of any suitable form, but preferably consists of an enlarged head 11 secured to a shank 12. The shank 12 extends into the opening 9 and is pivotally secured to the body portion 7 in any well-known manner, as by means of a rivet 13.

It will be noted by reference to Fig. 1, that a small amount of play is allowed between the body portion and the tooth 10, so that the tooth 10 swings to either side to allow for slight differences in the pitch of the chain or in the spacing of the links of the chain.

Extending upwardly from either side of the body portion 7, there are provided flaring guard flanges 14, which guide the chain to its position on the tooth 10. These flanges are strengthened and reinforced by ribs 15, which extend from the backs thereof. Extending from each side of the body portion 7, there are provided lugs 16 having openings therein through which extend members 17, which are adapted to secure the holders to the hub in any adjusted position. These members 17 preferably consist of screws which engage screw-threaded openings in the hub 2, and are provided with nuts 18 and 19, which engage the lugs 16 on opposite sides, so as to positively lock the holders 6 in any adjusted position with respect to the hub 2, from movement in either direction.

The utility of the device will be readily understood from the above description. If it is desired to have a sprocket wheel of greater or less diameter, the holders 6 can be readily swung toward or from the hub by loosening the nuts 18 and 19 and adjusting the holders to their new position, and then tightening the nuts 18 and 19 to secure the holders in their adjusted position. The pivotal connection of the tooth 10 with the holder 6 and the play allowed between the holder and the tooth, permit the tooth to adjust itself to any unevenness in the chain.

While I have shown one embodiment of my invention, I do not wish to be limited to the specific details thereof but desire to be protected in various changes and modifications which I may make within the scope of the appended claims.

Having thus described my invention, I claim as new and desire to secure by Letters Patent:

1. In a chain wheel, the combination with a hub, of a holder adjustably connected to said hub, means for locking said holder in any adjusted position, and a tooth movably secured to said holder, said holder having guiding guard flanges extending on opposite sides of said tooth.

2. In a chain wheel, the combination with a hub, of a holder pivotally connected to said hub, and a tooth pivotally connected to said holder and having a limited play relative thereto.

3. In a chain wheel, the combination with a hub, of a holder pivotally connected to said hub, and a tooth pivotally connected to said holder and having a limited play relative thereto, said holder having reinforced guard flanges extending on either side of said tooth.

4. In a chain wheel, the combination with a hub, of a holder pivotally connected to said hub, a tooth pivotally connected to said holder and having a limited motion relative thereto, one or more screws secured to said hub and adjustably engaging said holder, and nuts for securing said holder in any adjusted position with respect to said screws.

5. In a chain wheel, the combination with a hub, of a plurality of holders pivotally connected with said hub, a tooth pivotally connected with each of said holders and having a limited movement relative thereto, and means for locking each of said holders in any adjusted position relative to said hub.

6. In a chain wheel, the combination with a hub, of a holder pivotally connected with said hub, said holder having a socket therein, a tooth comprising a head and a shank pivotally connected to said holder and having its shank extending into said socket, said shank being of slightly smaller dimensions than said socket, and means for positively securing said holder to said hub.

In testimony whereof I have signed my name to this specification in the presence of two subscribing witnesses.

WILLIAM LATANÉ MONTAGUE.

Witnesses:
RUTH MARION GORTON,
CHAS. E. MILLS.